INVENTOR.
BY *Nobutoshi Kihara*
*Hill, Sherman, Meroni, Gross & Simpson*
ATTORNEYS INVENTOR.
BY Nobutoshi Kihara
Hill, Sherman, Meroni, Gross & Simpson
ATTORNEYS Feb. 8, 1966 NOBUTOSHI KIHARA 3,234,323

PICTURE SIGNAL RECORDING SYSTEM

Filed Oct. 23, 1961 3 Sheets-Sheet 3

INVENTOR.

BY Nobutoshi Kihara

Hill, Sherman, Meroni, Gross & Simpson

ATTORNEYS 3,234,323

PICTURE SIGNAL RECORDING SYSTEM

Nobutoshi Kihara, Shibuya-ku, Tokyo, Japan, assignor to Sony Corporation, Tokyo, Japan, a corporation of Japan Filed Oct. 23, 1961, Ser. No. 146,967
Claims priority, application Japan, Oct. 27, 1960, 35/43,412
8 Claims. (Cl. 178—5.2)

This invention relates to a picture signal recording system, and more particularly to a novel system for magnetically recording picture signals containing chrominance signals.

A standard color television signal has a luminance signal Y (hereinafter designated the Y signal) with a bandwidth of 4.1 mc. and composed of red, green and blue picture outputs, a chrominance signal I (hereinafter designated the I signal) with a bandwidth of 1.5 mc. and a chrominance signal Q (hereinafter designated the Q signal) with a bandwidth of 0.5 mc. The I and Q signals are transmitted by means of a color sub-carrier and in conjunction with the Y signal will hereinafter be referred to as the composite picture signal of the NTSC system.

When recording magnetically a composite picture signal according to the NTSC system, it has heretofore been usual to convert the composite signal to frequency-modulated form and record the frequency modulated signal on a single channel of a magnetic medium (by using a single magnetic head). Such a conventional method has the disadvantage that beat frequencies are generated by the mixing of the color subcarrier and the frequency modulation carrier so that favorable picture signals cannot be reproduced. Also a faithful picture signal composed of the Y, I and Q signals, namely the red, green and blue signals, cannot be reproduced because of the phase changes of the color subcarrier resulting from fluctuations in the speed of movement of the magnetic medium.

One object of this invention is to provide a picture signal recording system in which two magnetic heads are employed and one component signal of a picture signal, composed of three component signals by which the television color is reproduced, for example the Y signal, is recorded on one track of a magnetic medium by one magnetic head and the remaining two component signals, for instance and the I and Q signals, are recorded on another track on the magnetic medium, by the other magnetic head, thereby eliminating the aforesaid defects.

Other objects, features and advantages of this invention will become fully apparent from the following description taken in conjunction with the accompanying drawing, in which.

I will hereinafter explain the recording system of this invention in connection with an example in which picture signals of the NTSC system are recorded.

The frequency spectrum of a composite picture signal according to the NTSC system consists of a Y signal spectrum 1 having a bandwidth extending from 0 to 4.1 mc., an I signal spectrum 2 which has a bandwidth of 1.5 mc. in a lower sideband and 0.5 mc. in a higher sideband when a color subcarrier of 3.58 mc. is modulated by the I signal, and a Q signal spectrum 3 which has a bandwidth of 0.5 mc. in both sidebands when the color subcarrier of 3.58 mc. is similarly modulated by the Q signal.

Figure 1:
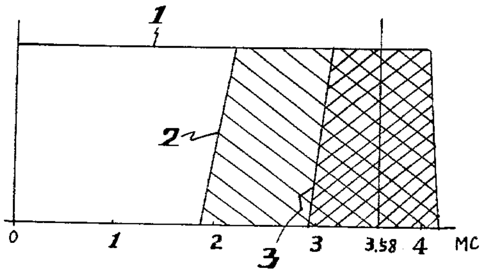
FIGURE 1 is a diagram illustrating the frequency spectrum of a composite picture signal according to the NTSC system.

In accordance with this invention, the Y signal having a bandwidth of 0 to 4.1 mc., the I signal with a bandwidth of 0 to 1.5 mc. and the Q signal with a bandwidth of 0 to 0.5 mc. are derived from the composite picture signal according to the NTSC system as shown in FIGURE 1. The Y signal is converted to a frequency-modulated signal and is supplied directly to one magnetic head for recording on one track of a magnetic medium. Either one of the I and Q signals, for example the Q signal, amplitude-modulates a carrier whose frequency is chosen so that the resulting frequency spectrum will be outside the I signal bandwidth. The amplitude-modulated Q signal and the I signal are mixed, and the resultant signal is used to frequency-modulate another carrier which is then applied to another magnetic head for recording on another track of the magnetic medium.

Figure 2:
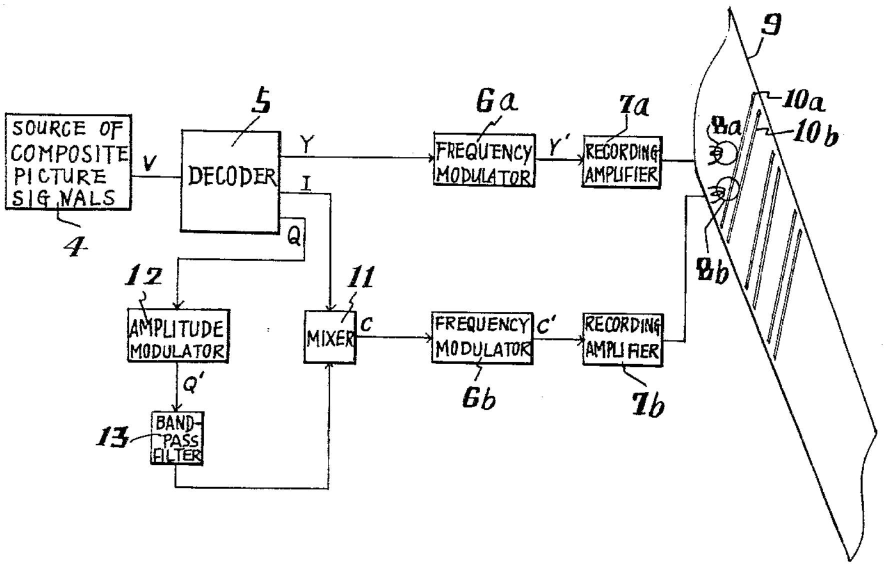
FIGURE 2 is a diagram illustrating one embodiment of a picture recording system according to this invention.

I will now explain an example of the recording system of this invention with reference to FIGURE 2, wherein 4 designates a source of composite picture signals according to the NTSC system. The composite picture signal V therefrom is supplied to a decoder 5, at the output end of which are obtained the Y signal having a bandwidth of 0 to 4.1 mc. as shown in FIGURE 3A, the I signal with a bandwidth of 0 to 1.5 mc. as illustrated in FIGURE 3B and the Q signal of 0 to 0.5 mc. bandwidth as shown in FIGURE 3C. The Y signal is applied to a frequency modulator *6a*, where the most desirable carrier frequency in relation to the characteristics of the magnetic head is modulated thereby and the resultant frequency-modulated Y signal designated Y′ is supplied to a recording amplifier *7a* to be amplified. The amplified signal Y′ is then recorded on one track **10*a* of a magnetic medium 9 by means of a magnetic head 8*a***.

Either the I or Q signal, for example, the I signal is supplied to one input of a mixer 11, while the Q signal is applied to an amplitude modulator 12, where a carrier of, for instance, 2 mc. is amplitude-modulated to provide a signal Q′ having a bandwidth extending from 1.5 mc. to 2.5 mc. (which lies outside the bandwidth of the signal I as illustrated in FIGURE 3D). The amplitude-modulated signal Q′ is supplied through a band-pass filter 13, if required, to a second input of the above mixer 11.

A color signal C is thus obtained which incorporates the signal I and the signal Q′ and has a bandwidth ranging from 0 to 2.5 mc. as illustrated in FIGURE 3E. The color signal C from the output of mixer 11 is delivered to a modulator *6b* similar to the frequency modulator *6a* so as to be frequency-modulated and the resultant frequency modulated color signal C′ is delivered through a recording amplifier *7b* to a magnetic head **8*b*, by which it is recorded to form another track 10*b* on the magnetic medium 9**.

Figure 4:
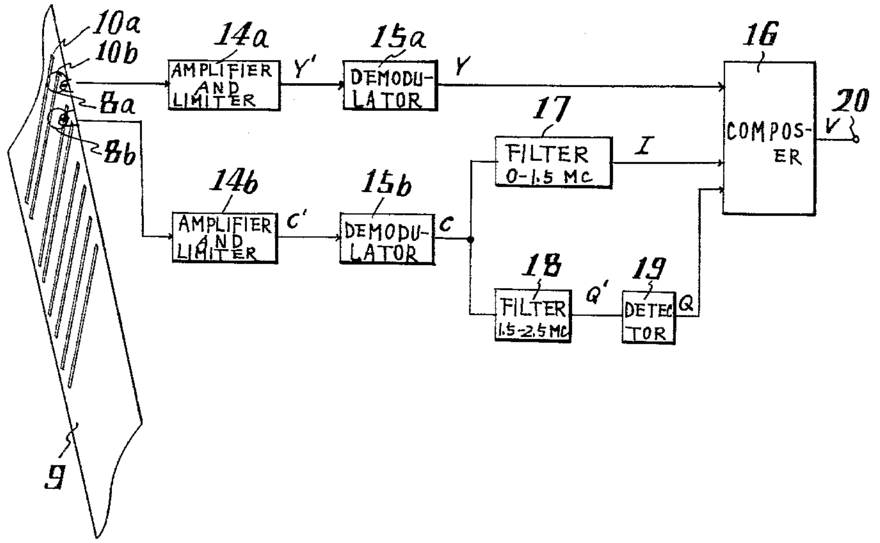
FIGURE 4 is a diagram showing one embodiment of the reproducing system of the present invention.

With reference to FIGURE 4 I will explain one example of a reproducing system for reproducing the signal recorded according to the system of this invention.

Figure 3:
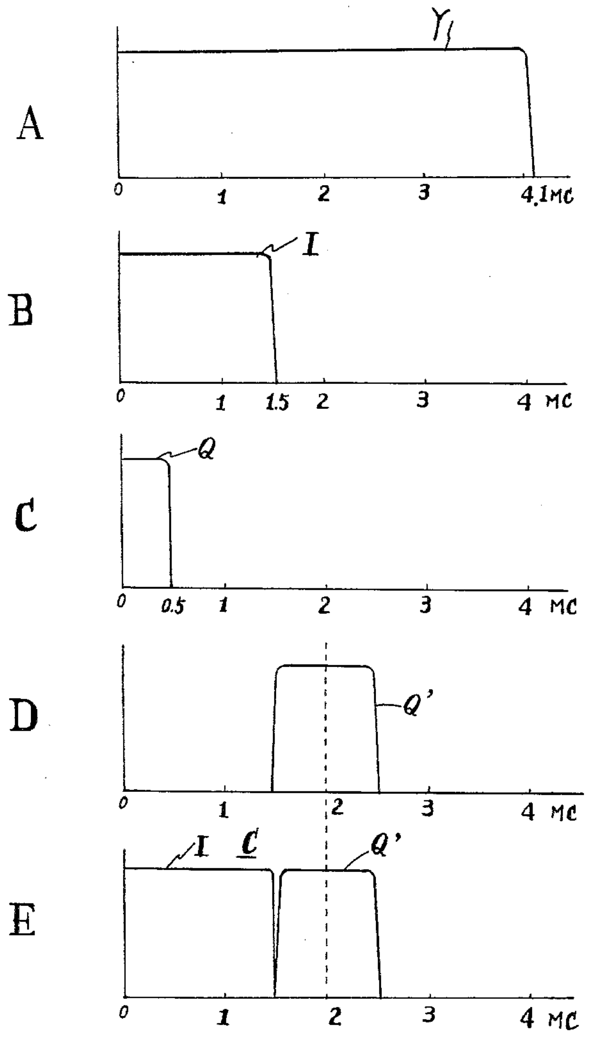
FIGURE 3 illustrates the frequency spectrums used in explaining the system shown in FIGURE 2.

The signal Y′ and chrominance signal C′ recorded on the magnetic medium 9 by the above described recording system are reproduced respectively by the magnetic heads *8a* and *8b* which contact the magnetic tracks **10*a* and 10*b*. The reproduced signals are amplified respectively by amplifier sections of components 14*a* and 14*b* and then converted to constant amplitude signals by passing them through a limiter section of said components. The reproduced signal Y′ from the amplifier and limiter 14*a* is added directly to a demodulator 15*a* so as to reproduce the signal Y having a bandwidth such as shown in FIGURE 3. The signal Y is then supplied to a composer circuit 16**. On the other hand, the chrominance signal C′ reproduced by the magnetic head *8b* is amplified and limited by the component **14*b*** and supplied to a demodulator 15*b* which then produces the chrominance signal C as illustrated in FIGURE 3E. This demodulated signal C is applied in parallel relation to a band-pass filter 17 having a band-pass range from 0 to 1.5 mc. and a band-pass filter 18 having a band-pass region from 1.5 to 2.5 mc. From the output end of the band-pass filter 17 is delivered the I signal such as shown in FIGURE 3B and from the other band-pass filter 18 is taken the signal Q′ as shown in FIGURE 3C. The Q′ signal is supplied to a detector 19 so as to reproduce the Q signal illustrated in FIGURE 3C. The thus obtained I signal and Q signal are supplied to respective inputs of the composer component 16 and the composite picture signal V according to the NTSC system is delivered at the output end thereof.

As is apparent from the above description, according to this invention it is possible to record a composite picture signal of the NTSC system on two channels of a magnetic record medium.

In the above explained system of this invention a color subcarrier is not used, hence beat frequencies between the color subcarrier and the main modulation carrier are not produced. The adverse effects of fluctuations in the speed of the magnetic medium on the reproduced color subcarrier are avoided so that faithful picture signals can be reproduced. Furthermore, since a demodulation means is not required for reproducing the I and Q signals from color signals carried by the color subcarrier, the linearity is not limited by the characteristics of such demodulation means.

In practice, it is sufficient to provide a bandwidth of 2.5 to 3.0 mc. for the Y signal, and this corresponds to the bandwidth of the I and Q mixed signal, consequently frequency characteristics of the magnetic medium can be determined only by the above bandwidth requirement for both signals, and magnetic heads of substantially the same characteristics can be employed. In this case, the bandwidth requirement for the two channels is 3 mc. or so, so that the relative speed of the magnetic medium and the magnetic heads can be reduced substantially as compared with the case where the composite picture signal is to be recorded on a single channel as in the conventional system. Therefore, the wear on the magnetic heads is reduced and the driving mechanism for the magnetic medium and the magnetic heads may be simplified. With the decrease of the bandwidth, devices such as modulators, demodulators, and amplifiers are simplified and the signal to noise ratio can be improved.

Moreover, in the conventional system of recording the composite picture signal, the I signal is usually reproduced in the bandwidth of 0.5 to 1 mc., while in the system of this invention, the I signal can be accurately reproduced in a bandwidth to 1.5 mc.; that is, the complete bandwidth of the I signal can be reproduced.

In the above description, the three components of the picture signals from which the original colors can be reproduced are respectively designated as the Y, I and Q signals, the Y signal being recorded by one magnetic head and the I and Q signals by the other magnetic head. For recording the red, green and blue picture signals, one of the components, for example, the green signal is recorded by one magnetic head and the other signals are recorded by the other magnetic head to obtain the aforesaid advantages of this invention. As is well known, the green signal requires a comparatively wide bandwidth and corresponds to the Y signal so that it is preferably recorded by one magnetic head, while the red signal corresponds to the I signal and the blue signal to the Q signal. The blue signal may be converted to an amplitude-modulated signal with the carrier frequency chosen so that the frequency spectrum of the resultant signal will be positioned at the upper sideband. The mixed signal is then recorded by the other magnetic head. It is of course possible to use either the red or blue signal to modulate the carrier so as to generate the desired frequency spectrum of the mixed chrominance signal.

It will readily be understood from the NTSC system that the red, green and blue signals can be obtained by composing the Y, I and Q signals.

Even when using a picture signal of another color system, similarly considering the picture signal to be composed of three components, one component of a comparatively wide bandwidth among them can be recorded by one magnetic head and the other components can be recorded by the other magnetic head.

It will be apparent that many modifications and variations may be effected without departing from the scope of the novel concepts of this invention.

What is claimed is:

1. The method of recording color television information comprising (a) providing a Y signal component having a band width of the order of from zero to 4 megacycles per second, an I signal component with a band width of the order of zero to 1.5 megacycles per second and a Q signal component having a band width of the order of from zero to .5 megacycle per second, (b) converting one and only one of the I and Q signal components to an amplitude modulated signal having a band width of the order from 1.5 megacycles per second to 2.5 megacycles per second.

(c) mixing the amplitude modulated signal having a band width of the order from 1.5 megacycles per second to 2.5 megacycles per second with the other of the I and Q signal components having a band width of the order of from zero to 1.5 megacycles per second to provide a mixed I and Q signal having a band width of the order of from zero to 2.5 megacycles per second, (d) frequency modulating a carrier signal in accordance with the Y signal component to provide a resultant Y frequency modulated signal and recording the Y frequency modulated signal on one channel of a record medium, and (e) frequency modulating a second carrier signal in accordance with the mixed I and Q signal having a band width of the order from zero to 2.5 megacycles per second to provide an I and Q frequency modulated signal and recording the I and Q frequency modulated signal on a second channel of the recorded medium.

2. The method of recording a color television signal having a Y signal component with a band width of the order of from zero to 4 megacycles per second, an I signal component with a band width of the order of from zero to 1.5 megacycles per second and a Q signal component with a band width of the order of from zero to .5 megacycle per second which comprises (a) recording the Y signal component on one channel of a record medium, (b) establishing a carrier signal of frequency of the order of 2 megacycles per second and modulating the amplitude of said carrier signal in accordance with the Q signal component and producing a resultant amplitude modulated signal having a band width of the order of from 1.5 to 2.5 megacycles per second and consisting essentially only of frequencies outside the band width of the order from zero to 1.5 megacycles per second of said I signal component, and (c) recording the amplitude modulated signal and the I signal component having a band width of the order of from zero to 1.5 megacycles per second without any amplitude modulation of the I signal component on a second channel of the record medium.

3. The method of recording a color television signal having a Y signal component with a frequency spectrum of the order of from zero to 4 megacycles per second, an I signal component with a frequency spectrum of the order of from zero to 1.5 megacycles per second and a Q signal component with a frequency spectrum of the order of from zero to .5 megacycle per second which comprises (a) recording the Y signal component on one channel of a record medium, (b) establishing a carrier signal of frequency of the order of 2 megacycles per second and modulating the amplitude of said carrier signal in accordance with one of said I and Q signal components and producing a resultant amplitude modulated signal having a band width of the order of from 1.5 to 2.5 megacycles per second and consisting essentially only of frequencies outside of the frequency spectrum of the other one of said I and Q signal components, (c) mixing the amplitude modulated signal having a band width of the order of from 1.5 to 2.5 megacycles per second and the other one of said signal components having a frequency spectrum consisting essentially of frequencies less than about 1.5 megacycles per second to provide a mixed I and Q signal, and (d) recording the mixed I and Q signal on a second channel of the record medium.

4. The method of recording color television information comprising (a) providing a Y signal component having a frequency spectrum of the order of from zero to 4 megacycles per second, an I signal component having a frequency spectrum of of the order of from zero to 1.5 megacycles per second and a Q signal component having a frequency spectrum of the order of from zero to .5 megacycle per second, (b) converting one and only one of said I and Q signal components to an amplitude modulated signal having a band width of the order of from 1.5 megacycles per second to 2.5 megacycles per second, (c) mixing the amplitude modulated signal with the other of the I and Q signal components which other signal component has a frequency spectrum consisting essentially of frequencies less than about 1.5 megacycles per second to provide a mixed I and Q signal having a band width of the order of from zero to 2.5 megacycles per second, (d) frequency modulating a first carrier in accordance with the Y signal component to produce a Y frequency modulated signal, (e) frequency modulating a second carrier in accordance with the mixed I and Q signal to produce an I and Q frequency modulated signal, (f) scanning a record medium moving in a longitudinal direction by means of two heads moving in unison transversely to the record medium along two paths offset in space from each other in the direction of travel of the record medium to scan along two adjacent tracks on the record medium in each cycle of movement of the heads, and (g) supplying the Y frequency modulated signal to one head and the I and Q frequency modulated signal to the other head for recording on respective series of transverse tracks which are interlaced with respect to each other along the length of the record medium.

5. The method of recording the I and Q signal components of a color television signal which comprises (a) providing an I signal component having a frequency spectrum of the order of from zero to 1.5 megacycles per second and a Q signal component having a frequency spectrum of the order of from zero to .5 megacycle per second, (b) converting one and only one of the I and Q signals to an amplitude modulated signal having a band width of the order of from 1.5 megacycles per second to 2.5 megacycles per second and above the frequency spectrum of the other of said I and Q signal components, (c) mixing the amplitude modulated signal with the other of the I and Q signal components to provide a mixed I and Q signal having a band width of the order of from zero to 2.5 megacycles per second, (d) frequency modulating a carrier in accordance with the mixed I and Q signal to provide a resultant frequency modulated signal and recording the resultant frequency modulated signal on a record medium, (e) scanning the record medium to produce an electric signal in accordance with the recorded frequency modulated signal, (f) demodulating the electric signal to provide a mixed I and Q signal having a frequency spectrum of the order of zero to 2.5 megacycles per second, (g) supplying the mixed I and Q signal to a first filter having a band pass width of the order of from zero to 1.5 megacycles per second and to a second filter having a band pass width of the order of from 1.5 to 2.5 megacycles per second, (h) detecting the output of the second filter to provide the other of the I and Q signals, and (i) composing the output of the first filter and the output of the detector with a Y signal component to provide a composite color television signal.

6. The method of recording green, red and blue signal components having respective original band widths of a color television signal which comprises (a) recording substantially the original band width of the green signal on one channel of a record medium, (b) converting one of the blue and red signal components to an amplitude modulated signal having a band width just beyond the original band width of the other of the blue and red signal components, (c) mixing the amplitude modulated signal and the other of the signal components without any amplitude modulation of said other of the signal components and with the other signal component having substantially its original band width to provide a mixed red and blue signal, and (d) recording the mixed red and blue signal on a second channel of the record medium.

7. A picture signal recording system comprising (a) means for providing a first signal component having a relatively large frequency spectrum and for providing second and third signal components having relatively smaller frequency spectrums, (b) a magnetic recorder having a plurality of magnetic heads and a magnetic medium, (c) means coupled to one of said heads for recording said first signal component on one channel of said magnetic medium, (d) means for displacing the frequency spectrum of one only of said second and third signal components to provide a resultant frequency spectrum which is still less than the frequency spectrum of the first signal component, and (e) means coupled to said displacing means and to another of said magnetic heads for recording the output signal from said displacing means on a second channel of the magnetic medium.

8. A picture signal recording system comprising (a) means for providing a Y signal component, an I signal component and a Q signal component, (b) a magnetic recorder having a plurality of magnetic heads and a magnetic medium, (c) a first frequency modulator coupled to said providing means for receiving said Y signal component therefrom and for producing an output carrier signal frequency modulated by said Y signal component, (d) an amplitude modulator coupled to said providing means for receiving one of said I and Q signal components therefrom and for producing an output carrier signal amplitude modulated by said one of said signal to have a frequency spectrum just beyond the frequency spectrum of the other of said I and Q signals, (e) a mixer coupled to said providing means and to said amplitude modulator for mixing said amplitude modulated signal and the other of said I and Q signal components which is not amplitude modulated, (f) a second frequency modulator coupled to said mixer for producing an output carrier signal which is frequency modulated by the output signal from said mixer, and (g) means coupling said first and second frequency modulators to respective magnetic heads of said magnetic recorder for recording the respective frequency modulated signals on respective channels of the magnetic medium.

References Cited by the Examiner

UNITED STATES PATENTS

| | | | |
|---|---|---|---|
| 2,892,017 | 6/1959 | Houghton | 178—5.4 |
| 2,909,596 | 10/1959 | Fay | 178—6.6 |
| 2,921,976 | 1/1960 | Johnson | 178—6.6 |
| 2,945,212 | 7/1960 | Shekels et al. | 340—174 |
| 2,960,563 | 11/1960 | Anderson | 178—5.4 |

DAVID G. REDINBAUGH, *Primary Examiner.*

STEPHEN W. CAPELLI, *Examiner.*